Figure 1:
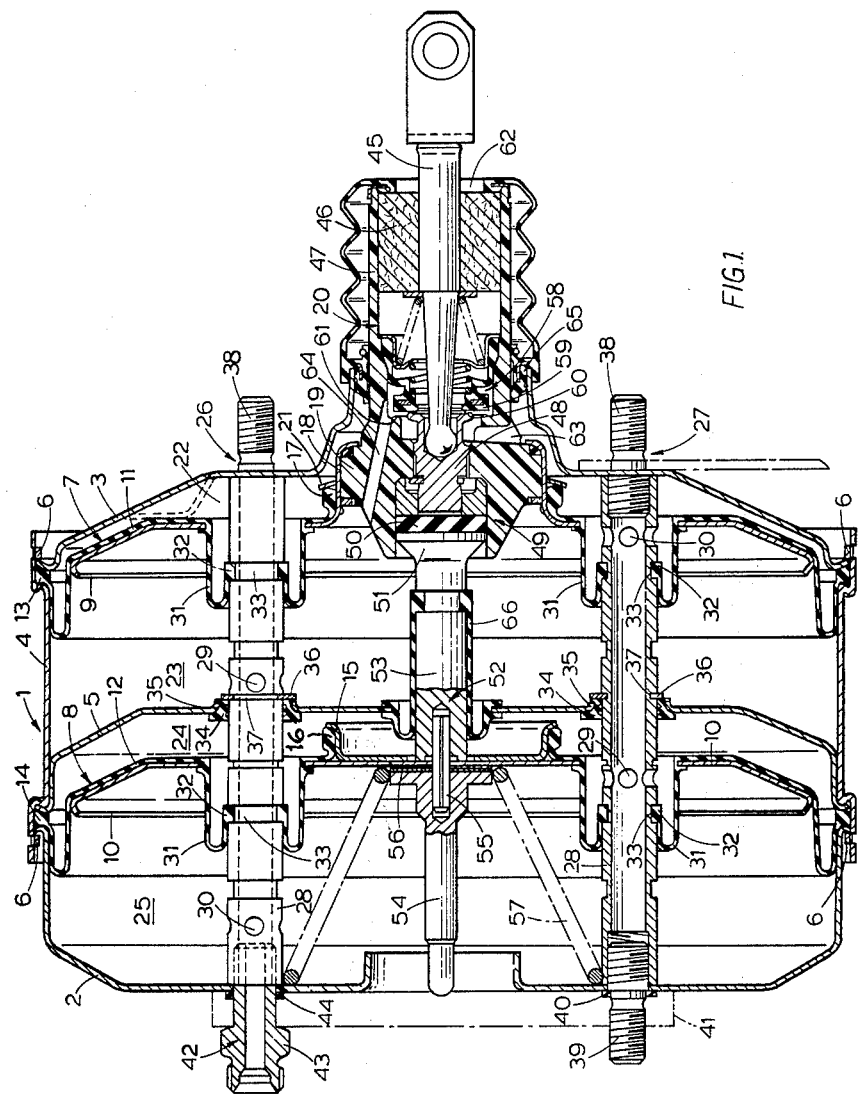

United States Patent [19]

Thomas

[11] 4,256,016
[45] Mar. 17, 1981

[54] SERVO BOOSTER FOR VEHICLE BRAKING SYSTEMS

[75] Inventor: Alfred W. Thomas, Koblenz, Fed. Rep. of Germany

[73] Assignee: Girling Limited, Birmingham, England

[21] Appl. No.: 40,910

[22] Filed: May 21, 1979

[30] Foreign Application Priority Data

May 20, 1978 [GB] United Kingdom ............... 20992/78
Oct. 18, 1978 [GB] United Kingdom ............... 41038/78

[51] Int. Cl.³ ............................................. F15B 9/10
[52] U.S. Cl. ................................. 91/369 A; 91/376 R
[58] Field of Search ................. 91/368, 369 A, 369 R, 91/369 B, 370, 371, 372, 373, 376; 92/48

[56] References Cited

U.S. PATENT DOCUMENTS

| 3,083,698 | 4/1963 | Price | 91/376 X |
| 3,096,689 | 7/1963 | Kytta | 91/369 A X |
| 3,292,502 | 12/1966 | Myers | 91/376 X |
| 3,613,506 | 7/1969 | Kytta | 91/369 A |
| 4,069,742 | 1/1978 | Gephart | 91/369 A |

FOREIGN PATENT DOCUMENTS 2845794 10/1978 Fed. Rep. of Germany ........ 91/369 A

Primary Examiner—Edward J. McCarthy
Attorney, Agent, or Firm—Scrivener, Clarke, Scrivener and Johnson

[57] ABSTRACT

In a tandem servo booster provided with a pair of ties extending through the housing and diaphragm assemblies for transmitting braking reaction forces from the master cylinder housing directly to the vehicle bulkhead, the ties are tubular and are provided with axially spaced ports to provide fluid communication between pairs of alternate booster chambers. In another construction both ties provide fluid communication between the same two booster chambers, and the other two chambers are connected together by a tubular member which is secured to the diaphragm support plate of the front diaphragm assembly and extends rearwardly through a partition wall of the housing positioned axially between the two diaphragm assemblies.

12 Claims, 4 Drawing Figures

SERVO BOOSTER FOR VEHICLE BRAKING SYSTEMS

The invention relates to a servo booster assembly for a vehicle braking system.

In the Specification of our British Patent Application No. 41321/78 we have disclosed a servo booster assembly for a vehicle braking system comprising a housing, a movable wall dividing the interior of the housing into two chambers and adapted to apply a force to an output member when the chambers are subjected to a pressure differential in response to a force applied to an input member, at least one stationary force transmitting means extending through the movable wall from one housing wall to a housing wall on the opposite side of the movable wall, and means sealing the movable wall directly or indirectly to the force transmitting means. Such a servo booster assembly will hereinafter be referred to as a 'servo booster assembly of the kind set forth'.

According to the present invention in a servo booster assembly of the kind set forth the force transmitting means is provided with passage means arranged to provide a fluid connection.

The passage means could provide a fluid connection between components external to the housing and at opposite ends thereof, but preferably it provides a fluid connection with one of the chambers.

The force transmitting means will usually comprise a tie.

The passage means could be used to provide fluid communication between said one chamber and an external vacuum or compressed air line, or it could be used to provide a fluid connection between said one chamber and a control valve assembly located in the housing.

Preferably, however, the servo booster assembly comprises a further movable wall arranged in tandem with said movable wall within the housing for applying an axial force to the output member, and means sealing the further movable wall to the force transmitting means, the housing comprising a transversely extending partition wall and located axially between the movable walls whereby four axially spaced chambers are defined within the housing by the partition wall and the movable walls, the passage means being arranged to provide fluid communication between an alternate two of the chambers.

Thus, in a tandem booster the invention enables a pair of alternate pressure spaces to be connected together in a simple manner without the provision of auxiliary connecting means which have previously been required. In order to avoid connecting pipes external to the housing it has been usual in the past to provide the partition wall with axially extending skirts which define passages connecting the alternate pressure spaces. The present invention makes such skirts unnecessary leading to a saving in weight and in the cost of producing the partition wall.

In one construction there are two force transmitting means which each comprise a tube, and the tubes are provided with axially spaced radial ports communicating directly with the respective alternate pressure spaces.

Conveniently the two tubes are identical but arranged to extend in opposite directions to each other such that the ports of one tube are suitably staggered with respect to those of the other tube.

However, in order to keep weight to a minimum the cross-sectional dimensions of the tubes of such a construction are restricted, and this may lead to an unacceptable resistance to fluid flow between the corresponding chambers resulting in an undesirable time delay between the actuation of the servo-booster and the attainment of the full booster output force corresponding to a given input force.

In a preferred construction a tubular member is secured to one of the movable walls and extends axially through an aperture in the partition wall, the tubular member is sealed to the partition wall, and the interior of the tubular member is arranged to provide permanent fluid communication between the other two chambers.

Preferably two stationary force transmitting members are provided in the preferred construction and each of these is provided with a passage means providing fluid communication between the same two chambers. The use of two force transmitting means in this way enables the previously mentioned time delay to be substantially reduced.

Preferably the tubular member is co-axial with the central axis of the booster. When two force transmitting members are used these are preferably then arranged diametrically opposite to each other with respect to the booster axis.

The means sealing the tubular member to the partition wall may comprise a sliding seal or a flexible diaphragm.

When the movable walls each comprise a diaphragm assembly the tubular member may be formed as an integral moulding with a diaphragm support plate of the diaphragm assembly, or it may be formed as a separate member sealingly secured to the support plate.

The tubular member is preferably connected to the front movable wall and extends rearwardly through the partition wall, the front of the booster being taken to be that end remote from the booster input member.

Preferably the tubular member is co-axial with the output member and the force applied by the front movable wall to the output member in use is transmitted through the tubular member.

We are aware that it has previously been proposed rigidly to connect together the two movable walls of a tandem booster assembly by the use of a tubular member co-axial with the output rod and to use the tubular member for providing fluid communication between two alternate chambers of the booster, but in the previously proposed arrangement the partition wall had to be provided at its outer periphery with a cylindrical skirt defining with the booster housing wall an annular chamber providing communication between the other two booster chambers, and provision had to be made for sealing the diaphragm of the rear movable wall to the rear end of the skirt.

Disadvantages of that arrangement are that the space occupied in the booster housing by the skirt and the annular chamber reduces the diameter of the movable walls that can be accommodated within the housing and thus the available output force, and that the diaphragms need to be differently dimensioned to account for the fact that one is sealed to the housing wall and the other to the skirt.

The invention enables the diameters of the movable walls to be maximised since the need to provide a skirt is avoided, and since the movable walls may be sealed to the housing in an identical manner diaphragms of the movable walls may be made identical if desired to reduce costs. The avoidance of a skirt may also lead to a saving in weight.

When the force transmitting means comprises a tube, at least one end of the tube is preferably provided with a closure member in the form of a stud adapted to connect the tube to a master cylinder housing or vehicle bulkhead, the stud being sealed in the end of the tube by any convenient means such as shear rivetting, by the use of an annular resilient seal or by a suitable adhesive.

The opposite end of the tube may be provided with a similar stud or with a connector for connecting the passage means of the tube to a vacuum or compressed air line, and if desired the connector may incorporate a non-return valve.

Preferably the ends of the tubes abut the interior surfaces of the housing walls when the walls are of substantially uniform thickness.

Preferably the means sealing each movable wall to each tube comprises a diaphragm fixed to the tube so that the ports in the tube do not become obstructed as might happen if the seal means were to be a sliding seal carried by the movable wall.

The two housing shells of a tandem servo booster are preferably spaced apart at their peripheries by a cylindrical member provided with a partition wall, and the peripheries of the housing shells are adapted to connect directly with each other such that identical housing shells may be used to provide the housing of a booster having a single movable wall, the cylindrical member then being dispensed with.

In a booster having two movable walls the partition wall may be restrained from moving relative to a tubular force transmitting means in one direction by a circlip received in an external annular groove in the tube.

Figure 2:
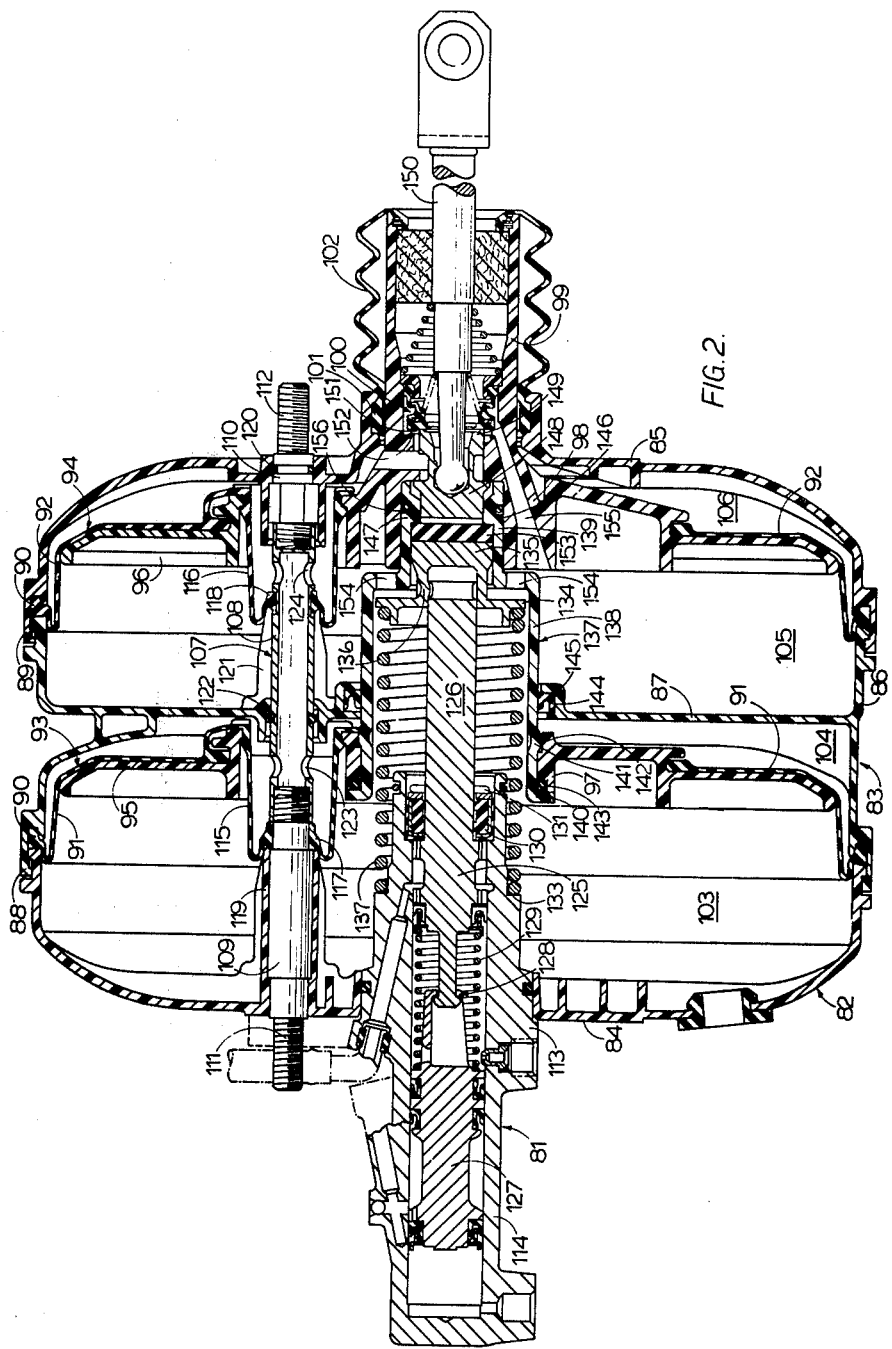
Figure 3:
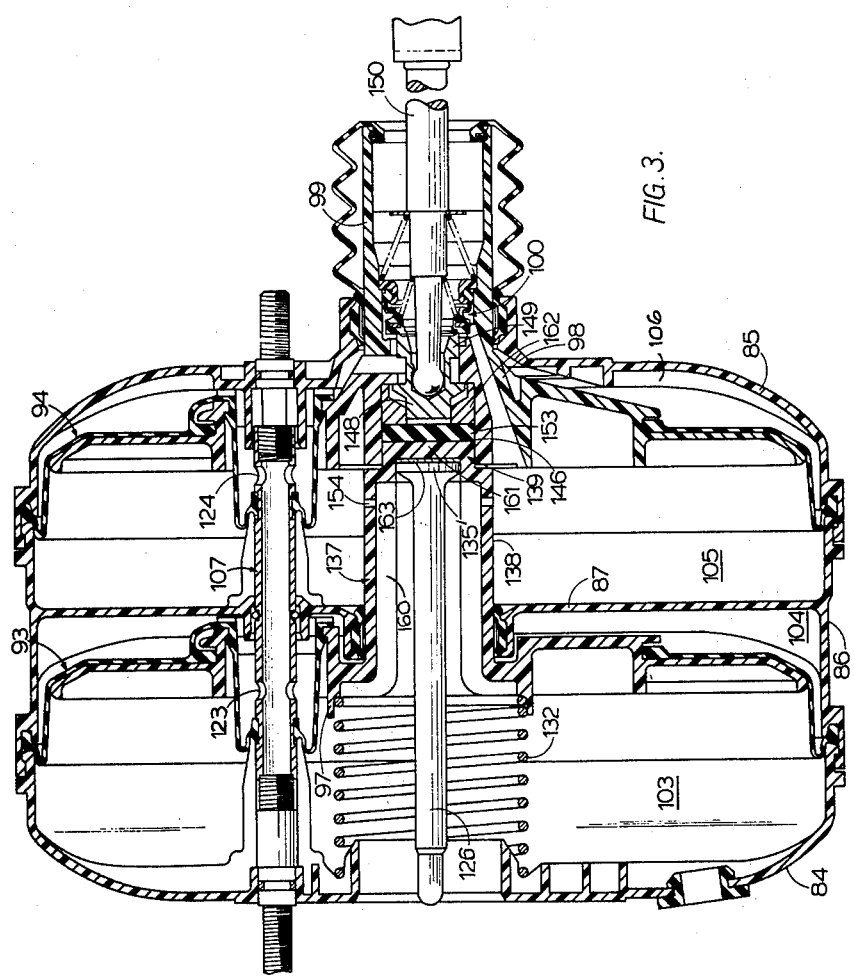
Figure 4:
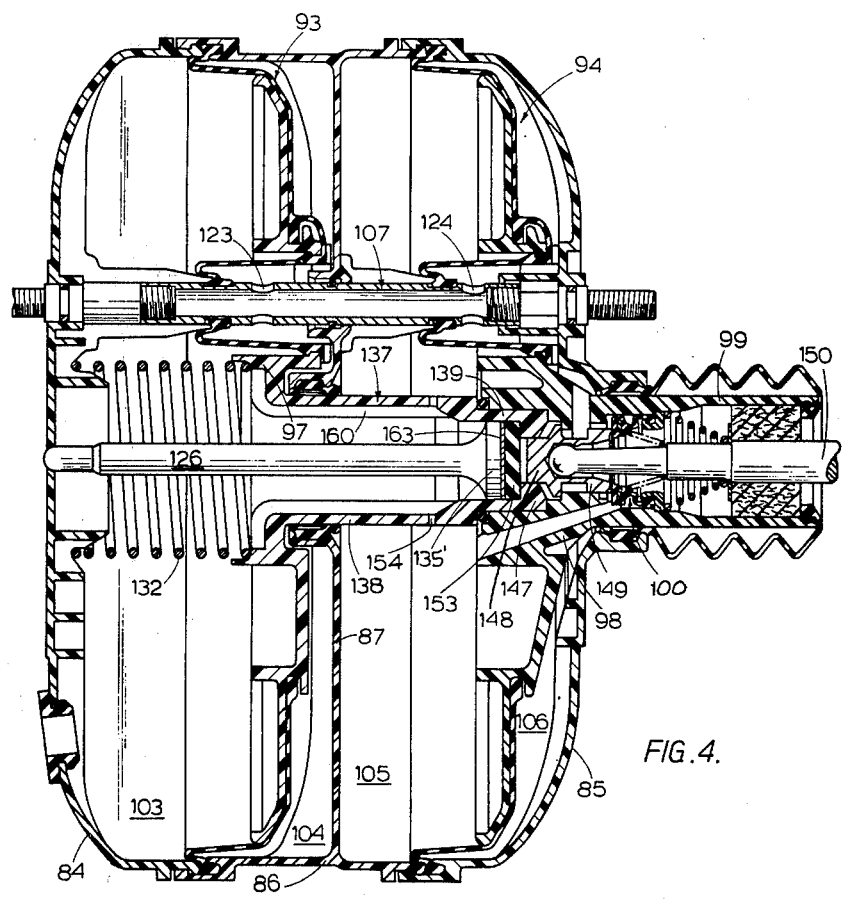

Various tandem servo boosters of the vacuum-suspended type and in accordance with the invention will now be described, by way of example only, with reference to the accompanying drawings in which:

FIG. 1 is a longitudinal cross-section of a booster with the input rod and movable walls being shown in their retracted positions;

FIG. 2 is a longitudinal cross-section of a tandem servo booster in accordance with the invention connected to an hydraulic tandem master cylinder, the upper tie assembly having been brought into the vertical plane for the purposes of illustration, and the parts being shown in their retracted positions; and FIGS. 3 and 4 are similar longitudinal cross-sections of modifications of the booster of FIG. 2.

With reference to FIG. 1 the booster comprises a housing 1 formed of four thin gauge steel pressings 2, 3, 4, and 5. Opposed housing shells 2 and 3 have their outer peripheries interconnected by cylindrical housing member 4, and the outer peripheries of the shells are connected to the member 4 in known manner by respective circumferentially spaced interengageable formations 6. Pressing 5 forms a partition wall spaced midway between shells 2 and 3.

First and second movable walls 7 and 8 each comprise a dished diaphragm support plate 9 and 10 respectively, supporting respective flexible diaphragms 11 and 12, the outer peripheral bead 13 of diaphragm 11 being clamped between the housing shell 3 and the housing member 4, and the corresponding bead 14 of the diaphragm 12 being clamped between the housing shell 2 and the outer periphery of the intermediate wall 5. The diaphragm support plate 10 has welded thereto a rearwardly facing pressed steel cup 15 against which seals an inner peripheral bead 16 of diaphragm 12. Diaphragm support plate 9 supports a corresponding bead 17 of diaphragm 11 on a central rearwardly extending tubular projection 18 engaging over the head 19 of a substantially cylindrical valve housing 20, a conical washer 21 pressed onto projection 18 holding the bead 17 in position.

First and second pressure spaces 22 and 23 defined between housing shell 3 and partition wall 5 respectively and the first movable wall 7, and second and third pressure spaces 24 and 25 are defined between partition wall 5 and housing shell 2 respectively and the second movable wall 8. In the unactuated condition of the booster all of the pressure spaces 22 to 25 are connected to a vacuum source, but on actuation of the booster the alternate pressure spaces 22 and 24 bounding the rears of the respective movable walls are connected to atmosphere.

Two diametrically opposed tie assemblies 26 and 27 extend axially through the entire housing and through both movable walls 7 and 8 and the fixed partition wall 5. Each tie assembly comprises an identical tube 28 extending between the opposing inner surfaces of the housing shells 2 and 3, and provided with two axially spaced series of radial ports 29 and 30. Ports 29 and 30 of the tie assembly 26 communicate directly with pressure spaces 23 and 25 respectively, and the bore of the tube together with ports 29 and 30 constitutes a passage means providing permanent communication between those two pressure spaces. The tubes 28 of the two assemblies extend in opposite directions to each other such that the ports 29 and 30 of the tie assembly 27 are staggered from those of the tie assembly 26 to provide permanent communication between the pressure spaces 22 and 24.

The diaphragms 1 and 12 of the two movable walls 7 and 8 are each integrally formed with two tubular rolling diaphragm portions 31 provided with annular beads 32 received within corresponding annular recesses 33 in the respective tubes 28 to seal the movable walls to both tie assemblies. The partition wall 5 is sealed to each of the tubes 28 by an annular seal member 34 held by a respective rearwardly directed circular flange 35 of the wall 5.

Rearward movement of the partition wall 5 relative to the tubes 28 due to the pressure differential existing across the wall 5 during actuation is prevented by circlips 36 engaged by the rear faces of seal members 34 and retained within annular grooves 37 in tubes 28. Thus the tie assemblies enable the partition wall 5 to be made less strong and therefore of lighter weight than would otherwise be necessary.

Each of the tubes 28 is enclosed at its rear end by a stud 38 of which the rear part is externally threaded to receive a nut for clamping the housing to a vehicle bulkhead. The central part of each stud 38 had been subject to a shear rivetting process to clamp the housing shell 3 into sealing engagement with the rear ends of the tubes 28.

The front end of the lower tube 28 in the drawing is shown closed by a modified stud arrangement in which an identical stud 39 is provided with a resilient annular seal 40 which will effect an efficient sealing of the housing when the stud 39 is secured to the flange 41 of a master cylinder.

The front end of the upper tube 28 in the drawing is provided with a tubular connector 42 adapted to connect to a vacuum supply line, not shown. The connector 42 is provided with a hexagonal part 43 which may be gripped for turning the connector to clamp the master cylinder flange 41 between head 43 and housing shell 2, seal 44 performing an identical function to that of seal 40.

An input rod 45 extends through an air filter 46 retained in a rearwardly extending tubular part 47 of valve housing 20 to engage with the input piston 48 of a well-known reaction assembly 49 including a resilient reaction disc 50 and the head 51 of an output rod assembly 52. Output rod assembly 52 comprises two rods 53 and 54 connected together by a spring pin 55 with the support disc 10 of the second movable wall 8 clamped between them, shims 56 controlling the overall length of the output rod assembly. A compression spring 57 acts between the front housing shell 2 and the support disc 10 to provide a return force for both movable walls.

A poppet valve assembly 58 of well-known kind comprises an axially compressible valve member 59 capable of engaging with a first annular seat 60 on the rear end of input piston 48 and with a second annular seat 61 on the valve head 19. In the retracted position of the input rod 45 the valve member 59 is engaged with the first seat 60 to isolate atmospheric inlet 62 from radial port 63 in the valve head 19 leading to pressure space 22, and is clear of the second seat 61 thereby permitting fluid communication between pressure spaces 23 and 22 by way of ports 64 and 63. Since pressure space 22 is permanently connected to pressure space 24 by the bore of lower tube 28 and ports 29 and 30, and since the pressure spaces 23 and 25 are similarly connected by the upper tube all of the pressure spaces are subject to a vacuum, connector 42 being connected in use to a vacuum supply line. On forward movement of the input rod the valve head 59 engages with second seat 61 and becomes disengaged from first seat 60 to admit atmospheric air into pressure space 22, and hence 24, through port 63 from inlet 62.

Seal assembly 65 retained within the rear end of housing shell 3 effects a seal between housing shell 3 and valve housing 29. A further rolling diaphragm 66 provides a seal between the partition wall 5 and rod 53.

It will be appreciated that as with the constructions disclosed in the Specification of our British Application No. 41321/78 previously referred to, the tie assemblies 26 and 27 in use provide a means for transmitting reaction forces from the master cylinder housing flange 41 to the vehicle bulkhead and of restraining the housing shells 2 and 3 from movement apart. This enables the housing shells 2 and 3 to be made less strong and therefore of lighter weight than hitherto.

With reference to FIG. 2 an hydraulic tandem master cylinder assembly 81 has its rear half mounted within the housing 82 of a pedal-operated vacuum tandem servo booster 83. Booster housing 82 comprises front and rear moulded plastics housing shells 84 and 85 and an intermediate moulded plastics shell 86 formed with an integral partition wall 87 extending transversely with respect to the booster axis. The shells 84, 85 and 86 have snap engagements with one another at 88 and 89 and clamp between them the peripheral beads 90 of flexible diaphragms 91 and 92 of front and rear movable wall assemblies 93 and 94 respectively. The peripheries of the housing shells 84 and 85 are shaped such that identical shells may be used in a servo booster having a single movable wall, the shell peripheries then being connected directly to each other by the corresponding formations, and the member 86 being dispensed with.

The movable walls 93 and 94 further comprise moulded plastics annular diaphragm support plates 95 and 96, plate 95 of the front movable wall 93 being integral at its radially inner margin with a forwardly extending axial sleeve 97, and rear plate 96 moulded integrally with a generally cylindrical valve body 98 provided with a rearwardly extending tubular extension 99 housing a poppet valve assembly 100. Valve body 98 is sealed to the rear housing shell 85 by an annular seal 101 slidably engaging with the outer surface of extension 99 and integral with a boot 102. The arrangement of seal 101 and boot 102 is the subject of our British Patent Application Ser. No. 29265/78.

The booster housing is partitioned into four chambers 103, 104, 105 and 106 by the movable walls 93 and 94 and by the fixed partition wall 87. A pair of stationary force transmitting members in the form of ties 107, only one shown, extend axially through the booster housing shells 84, 85 and 86 and through both movable walls 93 and 94, the two ties being arranged diametrically opposite to one another with respect to the central axis of the booster. Each tie 107 comprises a tubular central portion 108 having threaded engagements at opposite ends with stud portions 109 and 110 formed with threaded end portions 111 and 112 respectively which project outwardly of the booster housing 83 for connection respectively to a flange 113 of the master cylinder housing 114 and to a vehicle bulkhead, not shown.

The flexible diaphragms 91 and 92 are identical and are integrally formed with rolling diaphragm portions 115 and 116 respectively provided with annular beads 117 and 118 seated in annular recesses formed in the external surface of the ties 107. Bead 117 sealingly abuts the rear end of a ribbed sleeve 119 integral with front housing shell 84 to effect a seal between the front end of tie 107 and shell 84, and also seals chamber 103 from chamber 104. Seal 118 merely effects a seal between chambers 105 and 106, a separate annular seal 120 being provided on stud 110 to seal the rear end of tie 107 to the rear housing shell 85. The ribbed sleeve 119 provides a support for the rolling diaphragms 115 on forward movement of the front moveable wall 93, the rolling diaphragms 116 of the rear wall 94 being supported by a series of circumferentially spaced fins 121 extending rearwardly from and integral with the partition wall 87 of shell 86. The ties 107 are each sealed to the partition wall 87 by an annular seal 122.

In order to provide permanent fluid communication between the chambers 104 and 106 the identical ties 107 are each provided with axially spaced transverse through-bores 123 and 124, and the ties 107 are arranged to extend in the same direction, as compared with the FIG. 1 construction.

Master cylinder assembly 81 comprises a primary piston 125 integral with a booster output rod 126, and a secondary piston 127 connected to primary piston 125 by a lost-motion connection 128, a coil spring 129 urging the pistons apart. An annular seal assembly 130 retained in a counterbore in the rear end of the master cylinder housing 114 by a U-shaped wire retainer 131 acts as a stop to determine the retracted position of the primary piston 125, and therefore that of the secondary piston 127, the retraction force for the primary piston being provided by a coil spring 132 abutting a step 133 on the master housing 114 at its front end, and at its rear end against a flange 134 on a button 135 secured by a dimple 136 to the rear end of output rod 126.

A stepped tubular member 137 has larger and smaller diameter portions 138 and 139 respectively, and the larger diameter portion 138 is co-axial with output rod 126 and is rigidly connected at its front end to sleeve 97 by means of a radially outwardly directed terminal flange 140 and an outwardly swaged portion 141 received in a counterbore 142 to the bore of sleeve 97. An O-ring 143 effects a seal between the sleeve 97 and the tubular member 137 to isolate chambers 103 and 104, and the portion 138 of tubular member 137 is slidably sealed to the partition wall 87 by an annular seal 144 located in an annular trough 145 integral with partition wall 87.

The small diameter portion 139 of tubular member 137 is slidably received within a bore portion 146 at the front end of valve body 98, and portion 139 slidably receives the head of button 135. An internal flange 147 of portion 139 defines a bore in which is slidable the front end 148 of a valve control member 149 connected to the head of a pedal-operated input rod 150. In conventional manner, the rear end of the valve control member 149 and the valve body 98 are formed with co-axial valve seats 151 and 152 for engagement by the annular head of poppet valve assembly 100.

Permanent fluid communication between chambers 103 and 105 is provided by the interior of portion 138 of tubular member 137 and by a series of circumferentially spaced axially directed holes 154 provided in the step between portions 138 and 139 of member 137. Since the interior of portion 138 is of relatively large diameter little time is taken for pressure in chambers 103 and 105 to equalise when the pressure in the chamber 105 is altered by the poppet valve assembly 110 by means of passage 155 in valve body 98.

It should be noted that the movable walls 93 and 94 are not rigidly connected to each other. If the rear wall 94 should jamb in the housing then the front wall 93 may still be effective to provide a boost force since the wall 93 is capable of axial movement relative to the rear wall. An O-ring 156 is provided in an external annular recess in portion 139 of tubular member 137 to provide a sliding seal between portion 139 and valve body 98 to accommodate relative movement of the walls 93 and 94 whilst sealing chambers 105 and 106 from each other.

It will be appreciated that coil spring 132 is effective to return both movable walls 93 and 94 to their retracted positions in addition to retracting pistons 125 and 127. This feature is described in more detail in the Description of our British Patent Application Ser. No. 41039/78.

In the modified booster of FIG. 3 parts corresponding to those in FIG. 2 have been given corresponding reference numerals.

With reference to FIG. 3, the main differences between this construction and that of FIG. 2 are firstly that the tubular member 137 is formed integrally with the sleeve 97 of the front housing wall, the portion 138 being provided internally with longitudinally extending angularly spaced reinforcing ribs 160, secondly that circumferentially spaced ports 154 are formed in the portion 138 of tubular member 137, and thirdly in the manner in which the reaction disc 153 is confined. In this embodiment the reduced diameter portion 139 of tubular member 137 has a closed rear end wall 161 which is slidable directly in bore portion 146 of the valve body 98, and the elastomeric reaction disc 153 is confined by end wall 161, by the front of a sleeve 162 located in bore portion 146 and by front end 148 of valve control member 149. Output rod 126 is provided at its rear end with an integral head 135' which is received in the bore of portion 139 of tubular member 137 and engages with end wall 161 through a metal shim 163.

It will be seen that the force generated by the front movable wall 93 is transmitted directly to the output rod 126 by end wall 161, and that reaction disc 153 is not subject to this force but only to the force generated by the movable wall 94 which is transmitted to the ouput rod 126 by way of sleeve 162, reaction disc 153 and end wall 161.

Thus, the pressure generated in the elastomeric disc 153 in use which acts on the front end 148 of the valve control member 149 to provide a reaction force on the input rod 150 is due entirely to the force generated by the rear movable wall 94 and is independent of the force generated by the front wall 93. This will enable identical parts 85, 94, 98, 153, 162, and 149 to be used for a booster having only a single movable wall.

In the FIG. 3 construction there is no seal provided equivalent to O-ring 156 in FIG. 2 since the reaction disc 153 effects a seal between the chambers 105 and 106.

In the modification of FIG. 4 parts corresponding to those of the embodiments of FIGS. 2 and 3 have been given corresponding reference numerals. The FIG. 4 construction is similar to that of FIG. 3 in that the tubular portion 137 is integrally formed with sleeve 97 of the front movable wall 93, but shares the feature of FIG. 2 that the reaction disc 153 is arranged to transmit the sum of the forces generated by both movable walls 93 and 94.

I claim:

1. A servo booster assembly for a vehicle braking system comprising a housing, opposed housing walls of said housing, a movable wall positioned intermediate said opposed housing walls and dividing the interior of said housing into two chambers, an output member, an input member, a control valve assembly controlling the differential pressure of said chambers, said movable wall being arranged to apply a force to said output member when the movable wall is subjected to a pressure differential, a stationary force transmitting means extending between said opposed housing walls and through said movable wall, and means sealing said movable wall to said force transmitting means, said force transmitting means being formed with a passage.

2. A servo booster as claimed in claim 1 in which the passage communicates with one of said chambers for controlling the pressure of said one chamber.

3. A servo booster assembly as claimed in claim 1 and comprising a further movable wall arranged in tandem with said movable wall within said housing for applying an axial force to said output member, and means sealing said further movable wall to said force transmitting means, a partition wall of said housing located axially between said movable walls whereby four axially spaced chambers are defined within the housing by said partition wall and said movable walls, said passage being arranged to provide fluid communication between an alternate two of said four chambers.

4. A servo booster assembly as claimed in claim 3 and comprising a further stationary force transmitting means which is provided with passage arranged to provide fluid communication between the other two of said four chambers.

5. A servo booster assembly as claimed in claim 3 and comprising a tubular member secured to one of said movable walls, said partition wall being provided with an aperture, said tubular member extending axially through said aperture, and means sealing said tubular member to said partition wall, said tubular member being arranged to provide permanent fluid communication between the other two of said four chambers.

6. A servo booster assembly as claimed in claim 5 comprising a further stationary force transmittng means which is provided with a passage arranged also to provide fluid communication between said two chambers connected by said passage means of said other force transmitting means.

7. A servo booster assembly as claimed in claim 5 in which said tubular member is co-axial with the central axis of said housing.

8. A servo booster assembly as claimed in claim 5 comprising means connecting said tubular member to the front movable wall.

9. A servo booster assembly as claimed in claim 5 in which each movable wall comprises a respective diaphragm and a respective diaphragm support plate, and said tubular member is formed as an integral moulding with one of said diaphragm support plates.

10. A servo booster assembly as claimed in claim 1 in which the force transmitting means comprises a tube having open ends, a stud secured in one of said open ends, and means sealing the stud to said tube, said stud being accessible from the exterior of the housing for connection to an external member.

11. A servo booster assembly as claimed in claim 1 comprising an end portion of said force transmitting means, said end portion being provided externally of said housing with a port, and means connecting said port to said passage.

12. A servo booster as claimed in claim 2 wherein said passage provides fluid communication between said one chamber and said control valve assembly.

* * * * *